United States Patent [19]

Cizek

[11] Patent Number: 5,442,634
[45] Date of Patent: Aug. 15, 1995

[54] RESOURCE ALLOCATION TO NON-CRITICAL USERS

[75] Inventor: Paul J. Cizek, Palatine, Ill.

[73] Assignee: Motorola, Inc., Schaumburg, Ill.

[21] Appl. No.: 858,270

[22] Filed: Mar. 26, 1992

[51] Int. Cl.6 .............................................. H04Q 7/02
[52] U.S. Cl. ...................... 370/95.1; 379/59; 455/33.1; 455/34.1; 455/54.1; 340/825.5
[58] Field of Search ..................... 370/85.1, 85.6, 85.7, 370/94.1, 95.1, 95.3; 340/825.03, 825.44, 825.5, 825.51; 379/58, 59; 455/33.1, 34.1, 34.2, 53.1, 54.1, 54.2, 56.1

[56] References Cited

U.S. PATENT DOCUMENTS

| | | | |
|---|---|---|---|
| 4,012,597 | 3/1977 | Lynk, Jr. et al. | 455/54.2 |
| 4,831,373 | 5/1989 | Hess | 455/34.1 |
| 4,870,408 | 9/1989 | Zdunek et al. | 455/34.1 |
| 5,025,254 | 6/1991 | Hess | 455/34.1 |
| 5,054,110 | 10/1991 | Comroe et al. | 379/59 |
| 5,101,502 | 3/1992 | Felderman et al. | 455/34.1 |
| 5,123,110 | 6/1992 | Grube | 455/33.1 |
| 5,134,714 | 7/1992 | Jansen et al. | 370/95.1 |
| 5,168,575 | 12/1992 | Cizek et al. | 379/59 |
| 5,230,083 | 7/1993 | Sasuta | 455/34.1 |

Primary Examiner—Douglas W. Olms
Assistant Examiner—Alpus H. Hsu
Attorney, Agent, or Firm—Susan L. Lukasik; Steven G. Parmelee; Wayne J. Egan

[57] ABSTRACT

In a communication system having a plurality of sites (100, 101), resource allocations are monitored in the plurality of sites to identify communication resources (108) that support communications for critical members of a user group and historical information is developed regarding the communication resources. When a communication request is received from a member of a first user group, a determination is made as to whether at least one site includes only non-critical members of the first user group. A decision is made to allocate a communication resource in the non-critical-only site(s) in support of the communication request as a function of the historical information.

15 Claims, 3 Drawing Sheets

RESOURCE ALLOCATION TO NON-CRITICAL USERS

FIELD OF THE INVENTION

This invention relates to communication systems, including but not limited to allocation of resources in simulcast trunked communication systems.

BACKGROUND OF THE INVENTION

Trunked communication systems are known to comprise a plurality of communication units, a limited number of communication resources that are transceived Via a predetermined number of repeaters, or base stations, and a communication resource allocator that allocates the limited number of communication resources among the plurality of communication units. The communication resources may comprise a TDM bus, a carrier frequency, a pair of carrier frequencies, or any RF transmission means. Of the communication resources, one is selected as the control channel which transceives operational data between the communication resource allocator and the communication units. The communication units, which may be portable radios and/or mobile radios, are arranged into talk groups, also called user groups, by commonality of use. For example, a user group may comprise communication units that are operated by a police department while another user group comprises communication units operated by a fire department.

In simulcast, multi-site trunked systems every call targets every site, and a communication resource is assigned to the call at each site. In such a system, all members of a user group have equal priority because each member is included in every conversation from its user group. More advanced trunked systems are more selective. They employ a technique such as dynamic site assignment, where a resource is assigned only to those sites that contain members of the user group associated with a call.

Other distinctions can be made. An individual unit may be designated as a critical or non-critical user. When any user, critical or non-critical, requests a resource, and a resource is available, the resource is assigned. When a resource is not available, however, a critical user must either wait for a resource or deal with a busy condition. If the resources are busy with non-critical users, the critical user suffers, as may others, especially if this is a life-threatening situation. A better balance of the needs of both critical and non-critical users is thus required.

Therefore, a method of efficient allocation of resources between critical and non-critical users is desired.

DESCRIPTION OF A PREFERRED EMBODIMENT

The following describes a method and apparatus that identifies members of user groups as critical or non-critical, and based on compilation of critical user communication data, allocates or denies allocation of resources for non-critical member requests in anticipation of impending critical user need.

Figure 1:
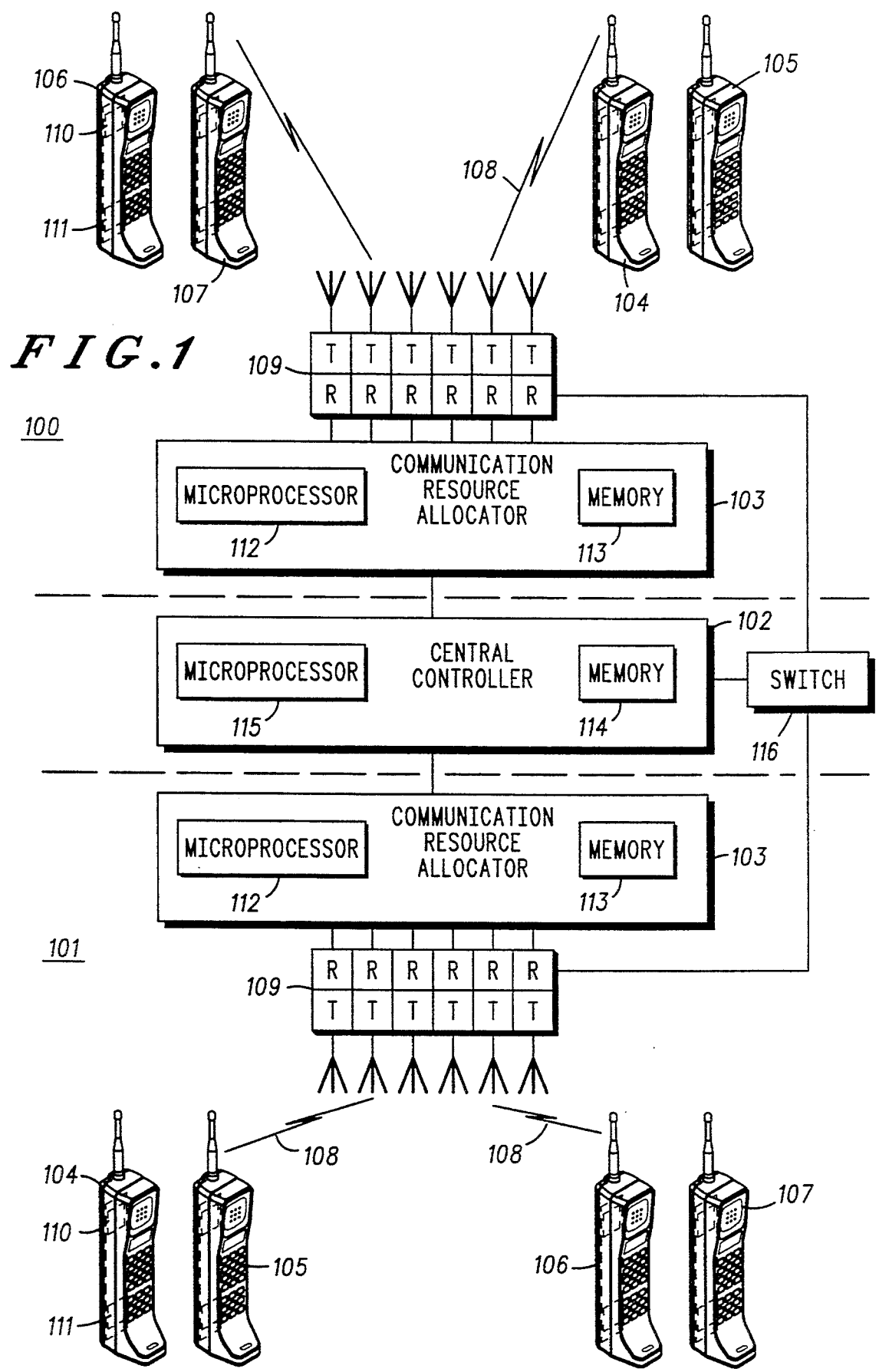
FIG. 1 illustrates a communication system network in accordance with the invention.

FIG. 1 illustrates a trunked communication system including a plurality of communication sites 100 and 101 (only two shown) that are operably coupled via. a central controller 102. Each communication site comprises a communication resource allocator 103, a plurality of communication units (only four shown) 104–107, a limited number of communication resources 108, and a limited number of repeaters 109.

Each of the communication units 104–107, comprises at least one microprocessor 110 and a digital storage memory device 111 that may be RAM, ROM or any other type of means for storing digital information. The communication unites 104–107 are configured into user groups, wherein two or more communication units form a user group. Communication units of a user group are predetermined to be either critical or non-critical members of a particular user group. User groups may be assigned priority levels relative to each other.

The communication resource allocator 103 comprises at least one microprocessor 112 and a digital storage memory device 113 that may be RAM, ROM or any other type of means for storing digital information. Each of the communication resources 108 are transceived between the communication units 104–107 and the communication resource allocator 103 via the repeaters 109, wherein the repeaters may comprise base stations. One of the communication resources functions as a control channel that transceives trunked communication system control data between the communication resource allocator 103 and the communication units 104–107.

In the communication system, a communication unit can operate in any of the communication sites of the network. This is generally accomplished by the communication resource allocator 103 of each communication site communicating with a hub computer network, or central controller 102, a technique that is well known in the art. The central controller 102 comprises at least one microprocessor: 115 and a digital storage memory device 114 that may be RAM, ROM or any other type of means for storing digital information. The repeaters 109 in each communication site 100 and 101 are connected to a switch 116 which is under the control of the central controller 102. The switch 116 consists of a switch matrix or other means to route audio from one port to another as is known in the art.

When a communication unit 104 starts a communication, it transmits an inbound signalling word (ISW) to the communication resource allocator 103 of the communication site in which it resides. The communication resource allocator 103 and central controller 102 process the ISW, as is known in the art, and allocate a communication resource to the communication unit 104.

One type of trunked communication system data is a registration of a communication unit with the site 100 in which the communication unit is transceiving on the control channel. Each site 100 has an associated radio frequency coverage area, and communication units 104–107 within the coverage area of the site 100 register via the control channel with the communication resource allocator 103 of the site 100. As communication units 104–107 traverse the coverage area of the site 100 and roam into a second site 101, the communication units 104–107 register via the control channel with the communication resource allocator 103 of the second site 101. The central controller 102 retrieves the site registration information from all sites 100 and 101 and updates a site registration database stored within its memory 114. When a request for communication is received, the central controller 102 allocates communication resources at each site that has at least one member of the requesting user group registered. Communication system site coverage area, registration of communication units, roaming and re-registration of communication units, maintaining a site registration database, and allocation of resources based on registration of users is well known in the art.

Resources for a given request by a communication unit 104 are allocated within a site 100 or between multiple sites 100 and 101 by the central controller 102. The central controller 102 allocates resources 102 based on resource availability at each site and the priority level of the user group. Due to the limited number of communication resources 108 within each site, more requests for communication resources 108 may be received than can be processed, and the communication system becomes busy. When the central controller 102 cannot process a request for a communication resource, the central controller 102 issues a busy request and stores the request in a queue that is processed according to priority level of the user group relative to other pending user group requests and availability of communication resources. These procedures are known in the art.

Figure 2:
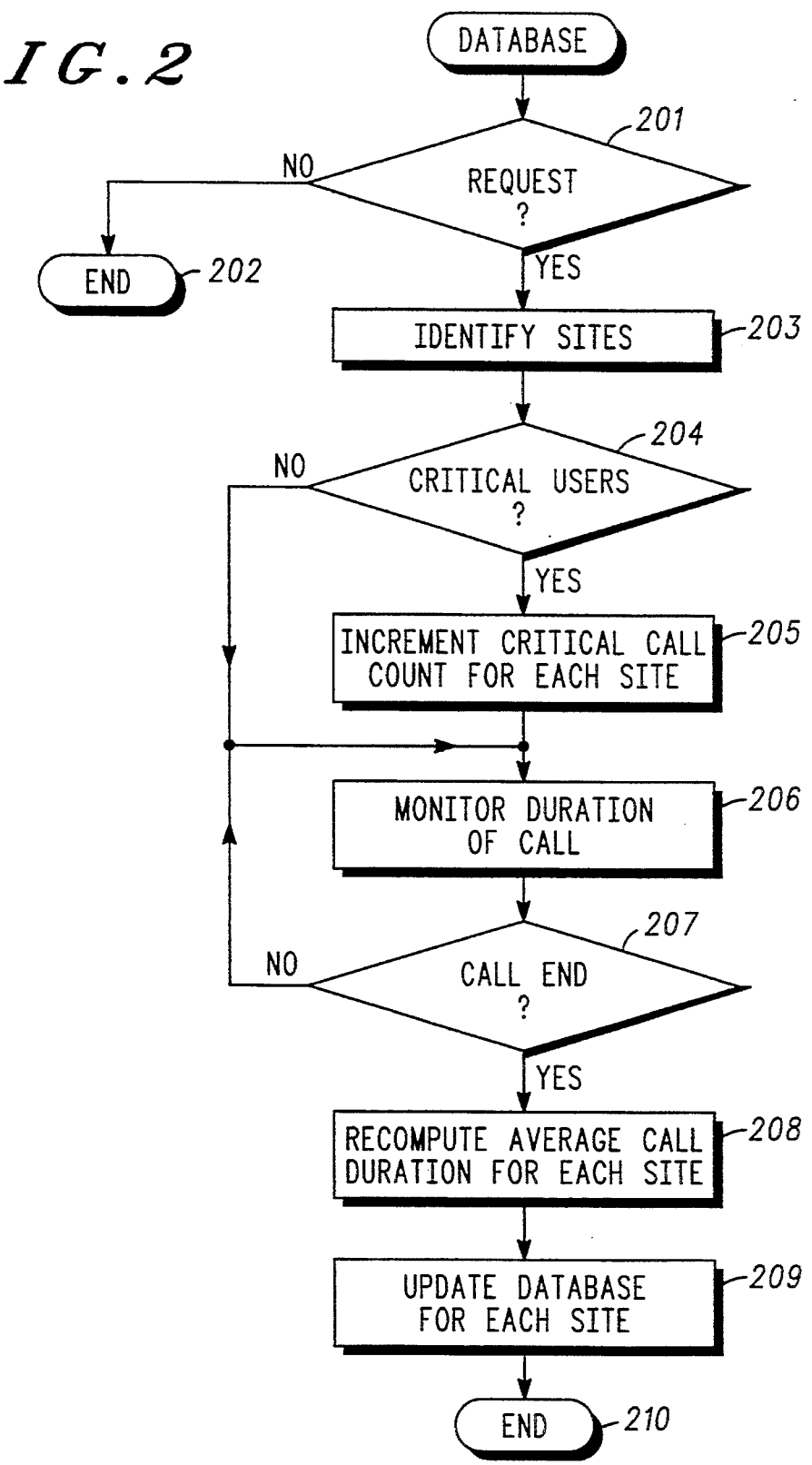
FIG. 2 is a flowchart showing accumulation of historical information for critical calls in accordance with the invention.

The central controller 102 compiles a database of historical information of communication activity to allocate communication resources based on site registration of critical and non-critical users and monitoring of resource allocations. The flowchart of FIG. 2 is performed by the microprocessor 115 of the central controller 102 to establish a call history database in memory 114. When the central controller 102 receives a request for a resource, it determines if the request is a standard request for communication at 201. If the request received at step 201 is not standard, i.e., the request does not request a communication resource, the central controller 102 ends the process at step 202 because the historical database is not updated for non-standard requests. If a standard request is received at step 201, the process continues with step 203.

At step 203, the central controller 102 retrieves from memory the site registration information related to the requesting user group and identifies which sites are required to process the communication request. For each site required in step 203, the central controller 102 determines if any of the sites have critical users registered at step 204. If there are no critical users at step 204, the process continues with step 206. For each site having at least one critical member of the requesting user group registered, the central controller 102 increments a critical call counter and stores the updated value as a critical count in a critical call database in memory 114 at Step 205.

At step 206, the duration of the call is monitored. This step 206 includes time stamping the allocation of communication resources by the central controller and storing the time stamp. The central controller 102, via the site communication resource allocator 103, determines the end of a call at step 207, and the process continues with step 208.

At step 208, the central controller 102 computes call duration by finding the difference between call start time and call end time. The central controller 102 also computes average call duration for each site by summing the call durations and taking a ratio of the sum of call durations to the number of calls. At step 209, the central controller 102 updates a call duration database in memory 114 for each site involved in the call by storing the computed average call duration 209 in memory 114, and the process ends at step 210.

Figure 3:
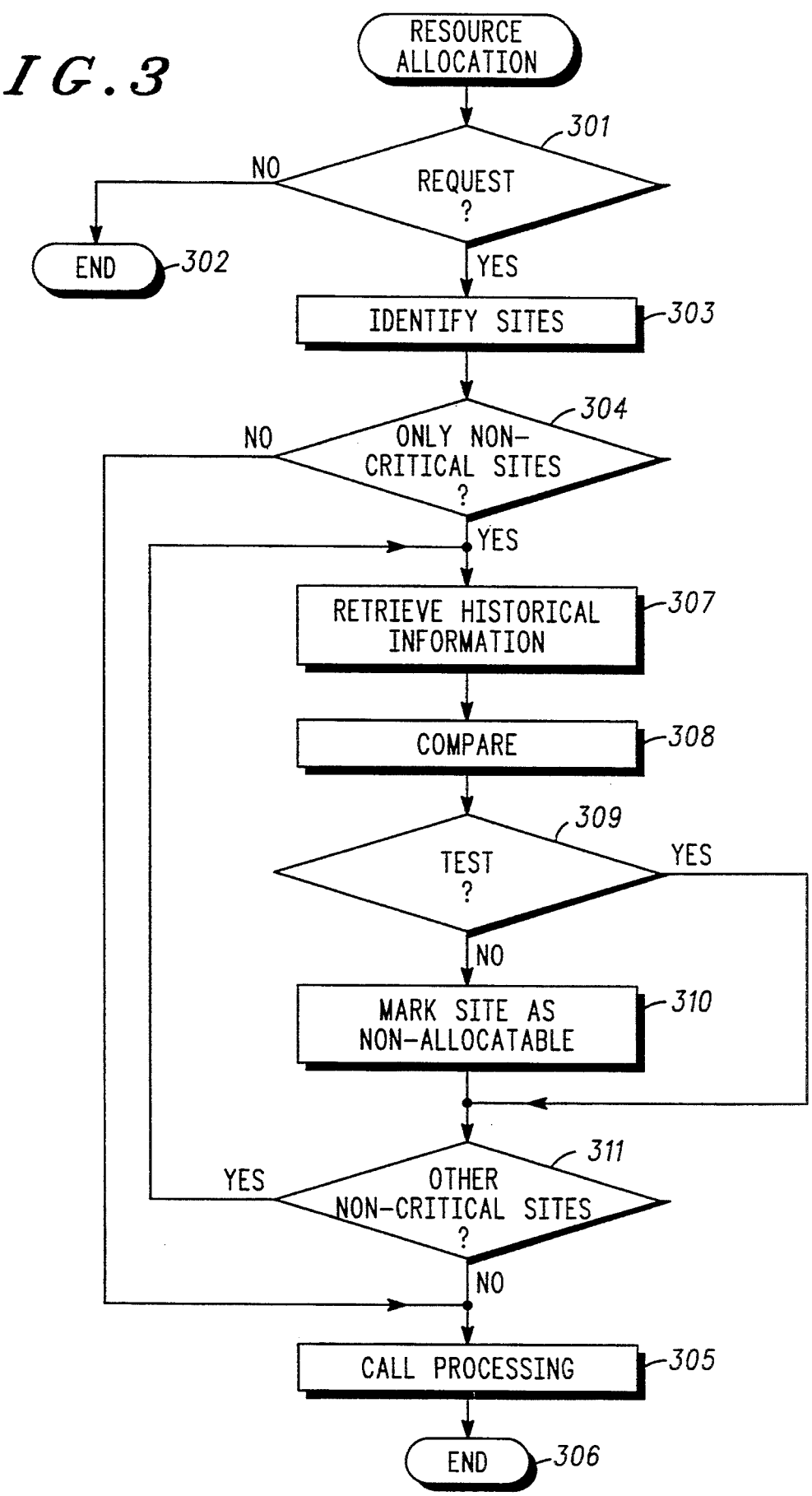
FIG. 3 is a flowchart showing resource allocation in accordance with the invention.

The flowchart of FIG. 3 is used by the central controller 102 to allocate communication resources based upon the knowledge of critical calls and critical members of user groups, i.e., the historical information developed in the process of FIG. 2. When the central controller 102 receives a request for a resource, it determines if the request is a standard request for communication at 301. If the request received at step 301 is not standard, i.e., the request does not request a communication resource, the central controller 102 ends this process at step 302 and responds to the request accordingly. If a standard request is received at step 301, the process continues with step 303.

At step 303, the central controller 102 retrieves from memory the site registration information related to the requesting user group and identifies which sites are required to process the communication request. For each site required in step 303, the central controller 102 determines if any of the sites have only non-critical members of the user group at step 304. If all of the sites have at least one critical user at step 304, the call is processed at step 305, as is known in the art, and the process ends at step 306. If the central controller 102 determines that at least one site contains only non-critical members at step 304, the process continues with step 307.

For each site containing only non-critical members, the central controller 102 retrieves historical information, including the critical call count and average call duration from the appropriate historical database in memory at step 307. The central controller 102 computes the critical call arrival rate by taking a ratio of the critical call count and a period of time that is determined by the central controller 102 as the length of time during which the critical call count has been updated at step 308. The central controller 102 then compares the critical call arrival rate with the average call duration for the site. If the average call duration is not substantially less than the critical call arrival rate at step 309, the process continues with step 311. Substantially less may be set at 3 seconds or 30 seconds depending on the system and the circumstances. The value of "substantially less" is defined by the system programmer or other appropriate person as the amount that is most appropriate for the system and circumstances.

If the average call duration is substantially less than the critical call arrival rate at step 309, the central controller 102 marks the site as non-allocatable at step 310, and the process continues with step 311. The marking of a site as non-allocatable results in a denial for allocation of a resource at the site even though a site communication resource allocator may indicate the availability of a resource. The central controller 102 continues with step 307 if there are other sites with only non-critical users at step 311. When no other sites with only non-critical users are left at step 311, the call is processed at step 305, as is known in the art, and the process ends at step 306.

As an example of the above process, a communication unit 104 in user group Alpha transmits a communication request, and the central controller 102 retrieves site registration information for user group Alpha. From the site registration information, the central controller 102 determines that the call is to be placed at sites named A, B, C, and D. The central controller 102 also determines that only non-critical members of user group Alpha have registered at sites B and D. The central controller 102 retrieves the historical database information for site B. The database for site B indicates a critical call count of 50 and a call duration average of 7 seconds. The central controller 102 computes the critical call arrival rate for site B by the ratio of the period of time the central controller 102 was counting the critical calls, 100 seconds. The value of critical call arrival rate would be 100 divided by 50 or 2 seconds. The central controller 102 then compares the critical arrival rate of 2 seconds with the average call duration of 7 seconds. Because 2 seconds is substantially less than 7 seconds, the central controller 102 determines that site B should be marked non-allocatable. Non-allocatable indicates to the central controller 102 that site B is anticipating critical call activity and a resource at site B should be denied for the non-critical members of group Alpha.

The central controller 102 performs the same computations and analysis for site D, another site with only non-critical members. In this example, the value of critical call arrival rate for site D is 10 seconds and the average call duration for site D is 8 seconds. The central controller 102 compares the critical call arrival rate of 10 seconds with the average call duration of 8 seconds. 10 seconds is not substantially less than 8 seconds, hence the central controller 102 determines that site D need not be marked non-allocatable. Because all sites with only non-critical members have been reviewed, the central controller 102 processes the request for group Alpha by allocating resources at sites A, C, and D. Thus, the decision to allocate communication resources is based on the developed historical information, and allocation for critical members is provided when non-critical members require resources.

By implementation of this invention, several important benefits result. Most importantly, a communication system can now better balance the needs of both critical and non-critical users of the system.

What is claimed is:

1. A method of allocating communication resources amongst a plurality of users belonging to one or more of a plurality of user groups in a communication system having a plurality of sites, wherein each site includes at least one communication resource that is allocatable to support a communication within an associated coverage area, the method comprising the steps of:
   A) monitoring resource allocations in at least some of the plurality of sites to identify communication resources that are supporting communications for critical members of at least one of the plurality of user groups;
   B) developing historical information regarding communication resources that are used to support critical members of the plurality of user groups;
   C) receiving a communication request from a member of a first user group of the plurality of user groups;
   D) determining whether at least one site includes only non-critical members of the first user group;
   E) when the at least one site includes only non-critical members, deciding to allocate a communication resource in the at least one site in support of the communication request as a function, at least in part, of the historical information.

2. The method of claim 1, wherein the historical information includes information regarding critical call arrival rate.

3. The method of claim 2, wherein the critical call arrival rate is determined with respect to a predetermined period of time.

4. The method of claim 1, wherein the historical information includes information regarding average duration of at least some communications supported by the site.

5. The method of claim 4, wherein the information regarding average duration comprises the average duration of all critical calls supported by the site.

6. The method of claim 4, wherein the information regarding average duration comprises the average duration of both critical and non-critical calls supported by the site.

7. The method of claim 1, wherein the historical information includes:
   A) information regarding critical call arrival rate with respect to a predetermined period of time; and
   B) information regarding average duration of at least some communications supported by the site.

8. A method for use in a communication system that comprises a plurality of sites, a central controller that interfaces with the plurality of sites, a plurality of communication units that are arranged into user groups and which units are designated as critical or non-critical members of the user groups, a limited number of communication resources that are transceived via a limited number of repeaters, and a communication resource allocator that allocates via the central controller the limited number of communication resources among the plurality of communication units, the method comprising the steps of:
   at the central controller:
   A) determining average time between critical calls and average call duration in at least one site to determine average arrival rate;
   B) receiving a request for a first user group communication from a communication unit of the first user group;
   C) determining that at least one of the sites in the communication system contains only non-critical users of the first user group;
   D) denying assignment of an available resource within each of the at least one of the sites having only non-critical users when the average time between critical calls is substantially less than the average call duration.

9. The method of claim 8, wherein the step A further comprises the step of counting each first user group communication wherein the first user group includes at least one critical user, and updating a critical call count database such that the critical call count database maintains a count of critical calls.

10. The method of claim 9, further including the step of determining the average time between critical calls by deriving a ratio of a period of time as determined by the central controller and the critical call count.

11. In the method of claim 9, wherein the step A further comprises the step of updating a call duration database such that the call duration database maintains an average duration of communications.

12. The method of claim 11, wherein the step D further comprises the step of comparing the average time between critical calls with the average call duration and preventing a communication resource allocation in a particular site having only non-critical users when the average time between critical calls in the particular site is substantially less than the average call duration.

13. The method of claim 8, wherein the step B further comprises the step of time-stamping the request.

14. The method of claim 13, wherein the step A further comprises the step of processing time-stamps.

15. The method of claim 8, wherein the critical members are predetermined to be critical in a particular user group.

* * * * *